UNITED STATES PATENT OFFICE.

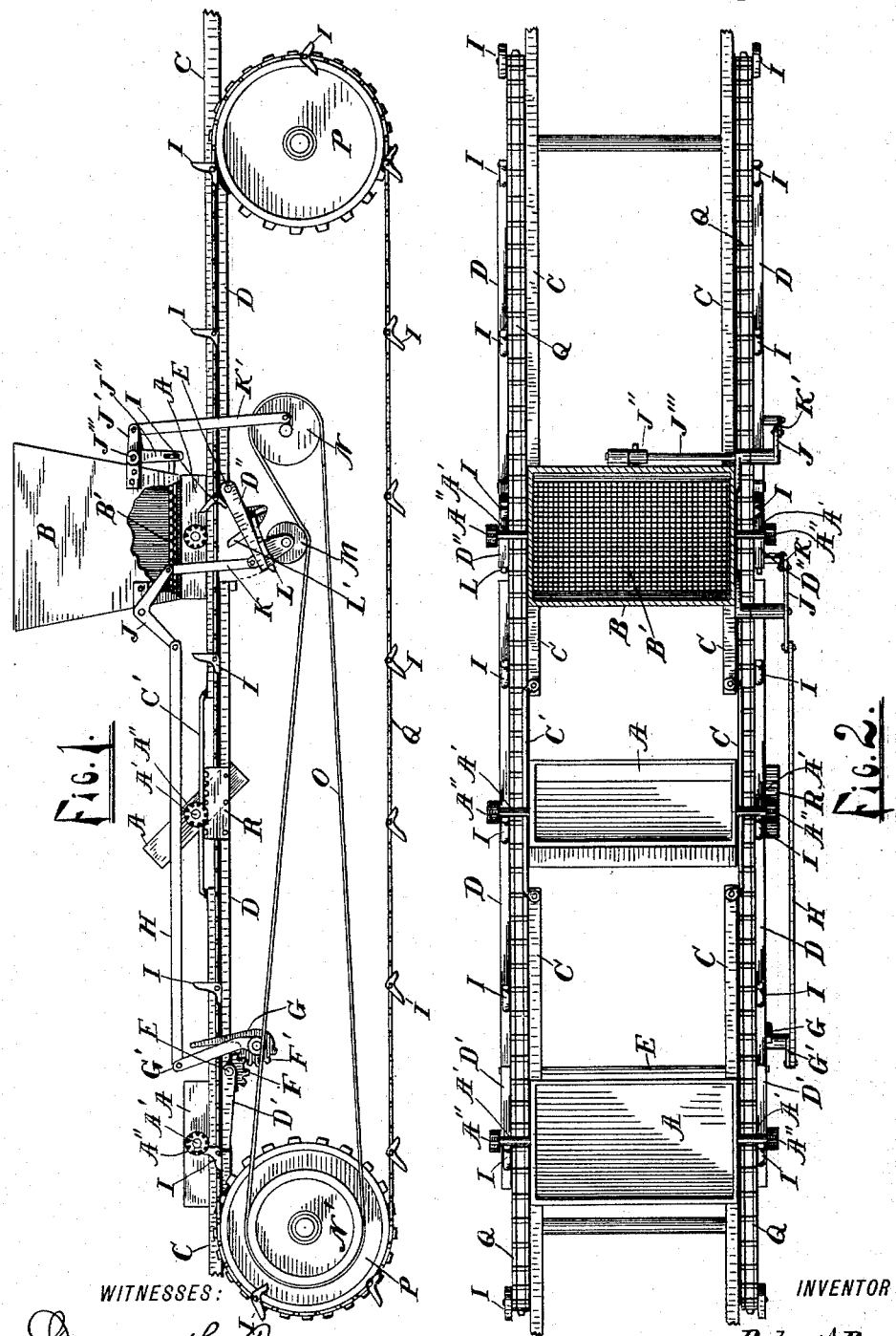

ROBERT A. BAUER, OF GRAND RAPIDS, MICHIGAN, ASSIGNOR OF TWO-THIRDS TO HENRY G. KREKEL AND EDWARD G. KREKEL, OF SAME PLACE.

MACHINE FOR FILLING AND EMPTYING TRAYS.

SPECIFICATION forming part of Letters Patent No. 483,488, dated September 27, 1892.

Application filed October 21, 1891. Serial No. 409,387. (No model.)

*To all whom it may concern:*

Be it known that I, ROBERT A. BAUER, a citizen of the United States, residing in Grand Rapids, in the county of Kent and State of Michigan, have invented certain new and useful Improvements in Machines for Filling and Emptying Trays; and I do hereby declare the following to be a full, clear, and exact description of the invention, such as will enable others skilled in the art to which it appertains to make and use the same.

My invention relates to improvements in machines for filling and emptying trays, and more especially the trays used in making candy-molds.

Its object is to provide such machinery with certain new and useful features, hereinafter more fully described, and particularly pointed out in the claims, reference being had to the accompanying drawings, in which—

Figure 1 is a side elevation of a device embodying my invention, and Fig. 2 a plan view of the same.

Like letters refer to like parts in all of the figures.

A represents the trays, of which any convenient number may be provided. These trays have oppositely-projecting journals A' at each end, upon the outer ends of which journals are pinions A'', adapted to engage the rack R, which has about the same number of teeth that the pinions have, to rotate the tray once upon its axis.

B is a hopper to receive the starch or other material for filling the trays, at the bottom of which hopper is arranged the vibrating sieve B', which is periodically operated by a pendent arm J'' on a rock-shaft J''', having at its outer end an arm J', connected by the pitman K' to the crank-wheel N, which is rotated by the belt O, said belt being actuated by the driving-pulley N' and periodically tightened by the idler M, as hereinafter explained.

C C are parallel tracks upon which the trays slide as they are propelled by the dogs I, engaging the journals A' on said trays, said dogs being pivoted in pairs and at regular intervals to sprocket-chains arranged parallel to each other, each chain engaging a sprocket-wheel P at each end of the machine, which wheels are provided with any suitable driving mechanism. Said tracks C C are removed for a suitable distance at the point when the trays are to be emptied, and the gaps in said tracks are spanned by rods C', arranged to engage the journals A' on the trays, and thus support the same, and permit them to rotate upon said journals as the pinion A'' engages the rack R. The dogs I are pivoted to the chains Q, and each consists of a vertical and horizontal arm with the pivot at the angle. Tracks D D, parallel with the upper part of the chains Q, engage the horizontal arms of said dogs and maintain the vertical arm of the same in position as it slides along said tracks. Each of said tracks is provided with a pivoted section D' near the receiving end of the machine and another pivoted section D'' beneath the hopper B, each pair of said pivoted sections being connected by a transverse rod E to operate them simultaneously. As these sections of said tracks are opened the dogs will be free to turn on their pivots and release the trays or pass without moving the same. The idler M is attached to the section D'', and as said section drops said idler engages the belt O and operates the sieve B', filling the tray left by dropping said section of track. The sections D'' are connected to the sections D by means of a rod K, bell-crank J, rod H, lever G', and gearing F F'. Another lever G projects upward from the gear F' in the plane of the pinion A'' and is engaged and moved forward thereby, this movement opening the sections D' and through the described connections closes the sections D'', which are secured by a latch L. While the described operation has been going on a pair of dogs I have engaged and removed the filled tray. As the next tray comes under the hopper it now engages a lever L', which releases the latch L and drops the section D'', the tray stopping beneath the hopper B and remaining there until a tray is placed over the section D', when a pair of dogs engage the same and it in turn advances, and, engaging the lever G, repeats the operation, each tray being inverted and emptied in turn as it passes the rack R.

What I claim is—

1. In a machine for filling and emptying trays, the combination, with parallel sprocket-chains, dogs pivoted to said chains, and tracks having movable sections engaging said dogs, of trays engaged by said dogs and tracks upon which said trays move, substantially as described.

2. In a machine for filling and emptying trays, in combination with trays having journals at opposite sides and pinions on said journals and mechanism for propelling said trays, tracks upon which said trays move, having gaps, rods opposite said gaps engaging said journals, and a rack to engage said pinions, substantially as described.

3. In a machine for filling and emptying trays, the combination, with trays having journals at each end and pinions on said journals, of parallel sprocket-chains, and tracks and dogs having arms at right angles, said arms engaging said journals and tracks, respectively, tracks upon which said trays slide, said tracks having gaps or openings, rods opposite said openings engaging said journals, and a rack engaging said pinions, substantially as described.

4. In a machine for filling and emptying trays, the combination of a sprocket-chain, dogs each having a vertical and horizontal arm and pivoted to said chain, a track engaging one arm of said dogs, pivoted sections in said track connected by levers and rods, trays moved by said dogs, and levers engaging said trays and operating said pivoted sections of track, substantially as described.

5. In a machine for filling and emptying trays, the combination of a sprocket-chain, dogs pivoted to said chain, a track engaging said dogs, a pivoted section, as D', in said track, a tray moved by said dogs, a lever engaging said tray, and gearing connecting said lever and pivoted section, substantially as described.

6. In a machine for filling and emptying trays, the combination of a sprocket-chain, dogs pivoted to said chain, a track engaging said dogs, a pivoted section, as D'', in said track, a latch securing said section when closed, a lever connected to said latch, and a tray moved by said dogs and engaging said lever and releasing said latch, substantially as described.

7. In a machine for filling and emptying trays, the combination of a hopper, a vibrating sieve in the same, mechanism to vibrate said sieve, a belt to operate said mechanism, a track having a pivoted section, a tightener on said section engaging said belt when said pivoted section is released, a latch to secure said pivoted section, having a lever engaging a tray beneath said sieve, and mechanism to deposit said tray beneath said hopper, substantially as described.

8. In a machine for filling and emptying trays, the combination of parallel socket chains, dogs each having arms at right angles and pivoted at intervals to said chain, tracks each having two pivoted sections connected to each other by levers and rods, so that each alternately opens and closes, said tracks engaging said dogs, and trays engaged and moved by said dogs and engaging levers to operate said sections, substantially as described.

In testimony whereof I affix my signature in presence of two witnesses.

ROBERT A. BAUER.

Witnesses:
  HENRY G. KREKEL,
  LUTHER V. MOULTON.